United States Patent [19]

Harrison

[11] Patent Number: 5,066,394
[45] Date of Patent: Nov. 19, 1991

[54] AQUARIUM AERATION AND RECYCLING APPARATUS

[76] Inventor: Mark R. Harrison, S71 W14976 Westcot Dr., Muskego, Wis. 53150

[21] Appl. No.: 560,350

[22] Filed: Jul. 30, 1990

[51] Int. Cl.$^5$ .................. E04H 3/20; A01K 63/04
[52] U.S. Cl. .................. 210/169; 210/416.2; 119/5
[58] Field of Search .......... 210/169, 291, 293, 416.2; 119/4, 5

[56] References Cited

U.S. PATENT DOCUMENTS

| | | | |
|---|---|---|---|
| 1,956,524 | 4/1934 | Byram | 119/5 |
| 2,253,516 | 8/1941 | Haldeman | 119/5 |
| 2,748,075 | 5/1956 | Hovlid | 210/169 |
| 3,609,343 | 9/1971 | Howlett | 119/5 |
| 3,749,901 | 7/1973 | Clough | 119/5 |
| 4,025,431 | 5/1977 | Saxton | 210/108 |
| 4,035,299 | 7/1977 | Vroeginday | 210/169 |
| 4,123,359 | 10/1978 | Smith | 210/169 |
| 4,144,841 | 3/1979 | Bliss et al. | 210/169 |
| 4,169,793 | 10/1979 | Lockshaw | 210/169 |
| 4,752,388 | 6/1988 | Ng | 119/5 |

FOREIGN PATENT DOCUMENTS 2384451 11/1978 France .................. 119/5

Primary Examiner—Stanley S. Silverman
Assistant Examiner—Robert James Popovics
Attorney, Agent, or Firm—Leon Gilden

[57] ABSTRACT

Apparatus including an aquarium tank formed of a floor and spaced side walls with the organization arranged interiorly of the aquarium adjacent to an upper water level of water within the aquarium. The apparatus includes a single or plurality of pump members to direct water through a housing including filtration portions thereon to direct the recycled and thusly cleaned water through output conduits arranged adjacent the side walls of the aquarium and to direct the thusly cleaned water through a circulation tube to direct the water at the water level surface to enhance aeration and minimize turbulence within the aquarium. The circulation tube in a modified embodiment is formed of a transparent material including an array of parallel fiber optic cables to effect illumination and coloration of the recirculated water for an enhanced visual effect.

7 Claims, 5 Drawing Sheets

PRIOR ART

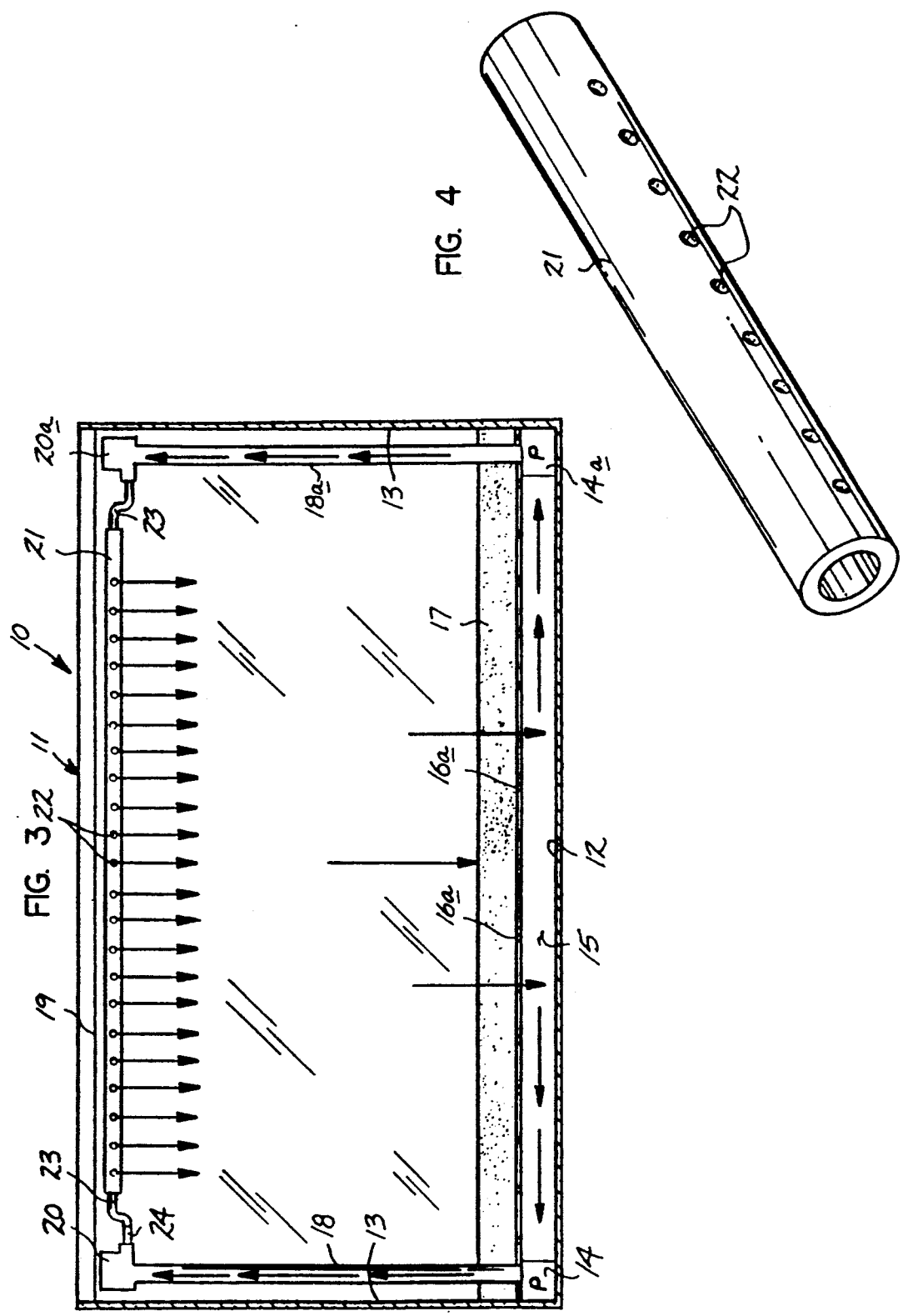

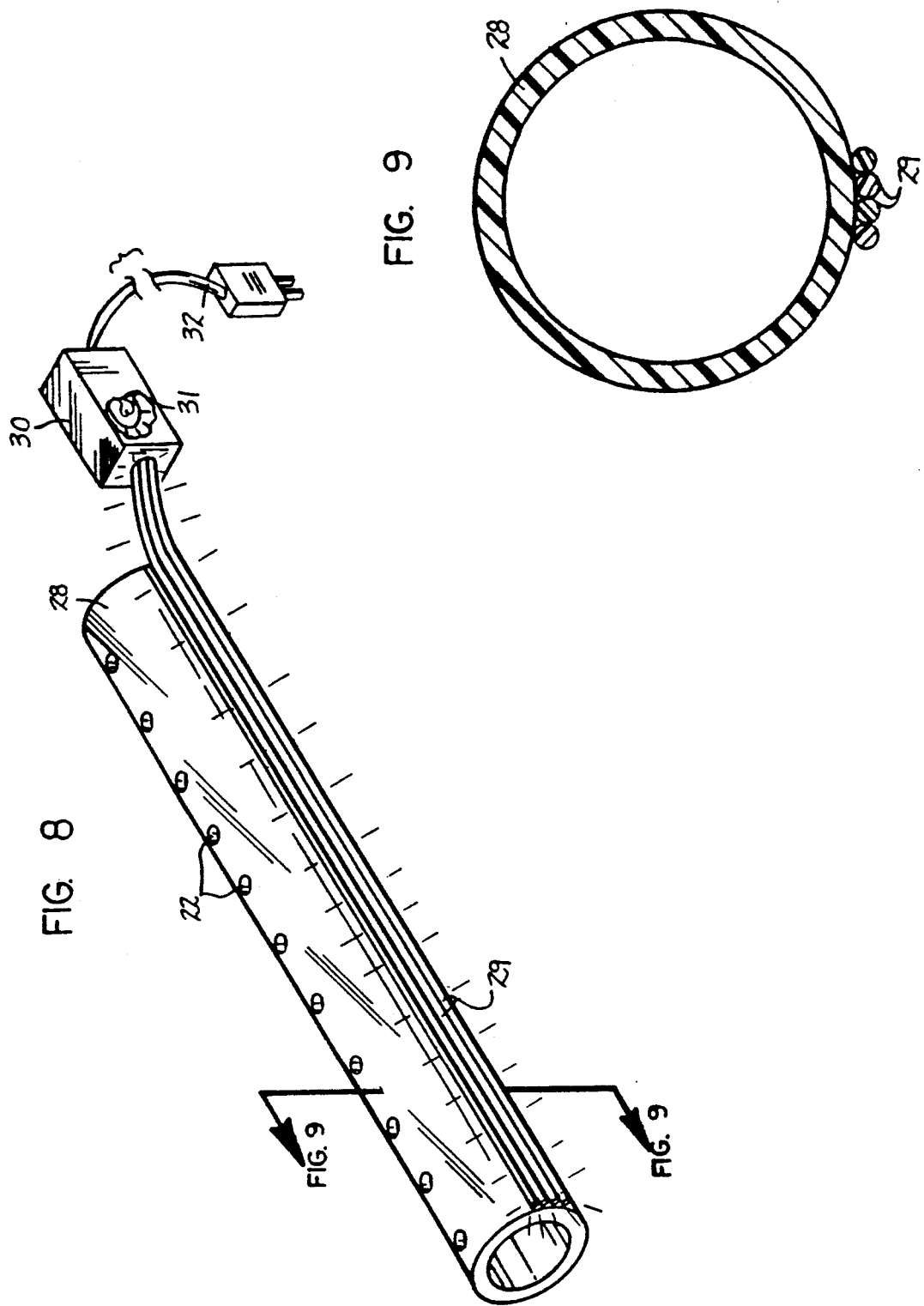

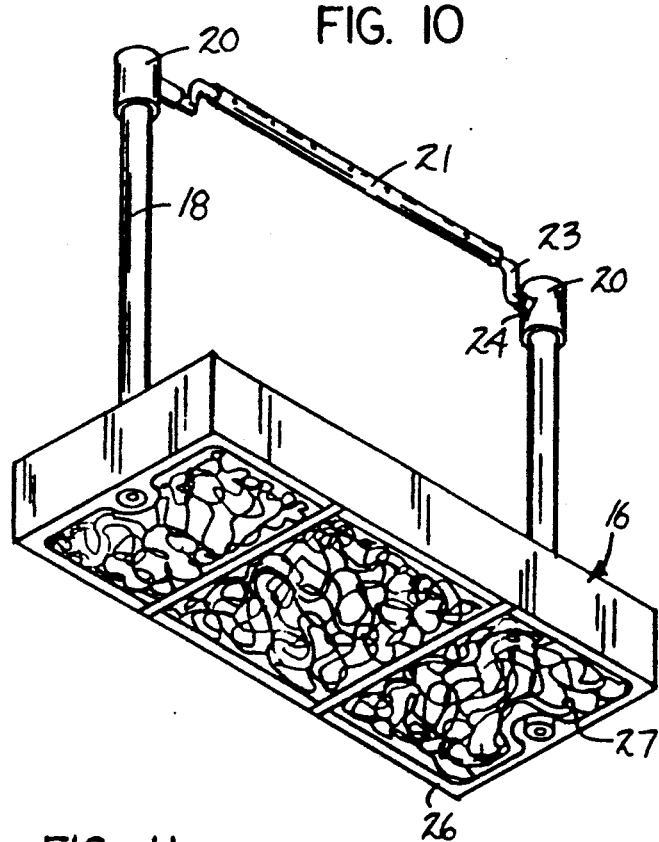
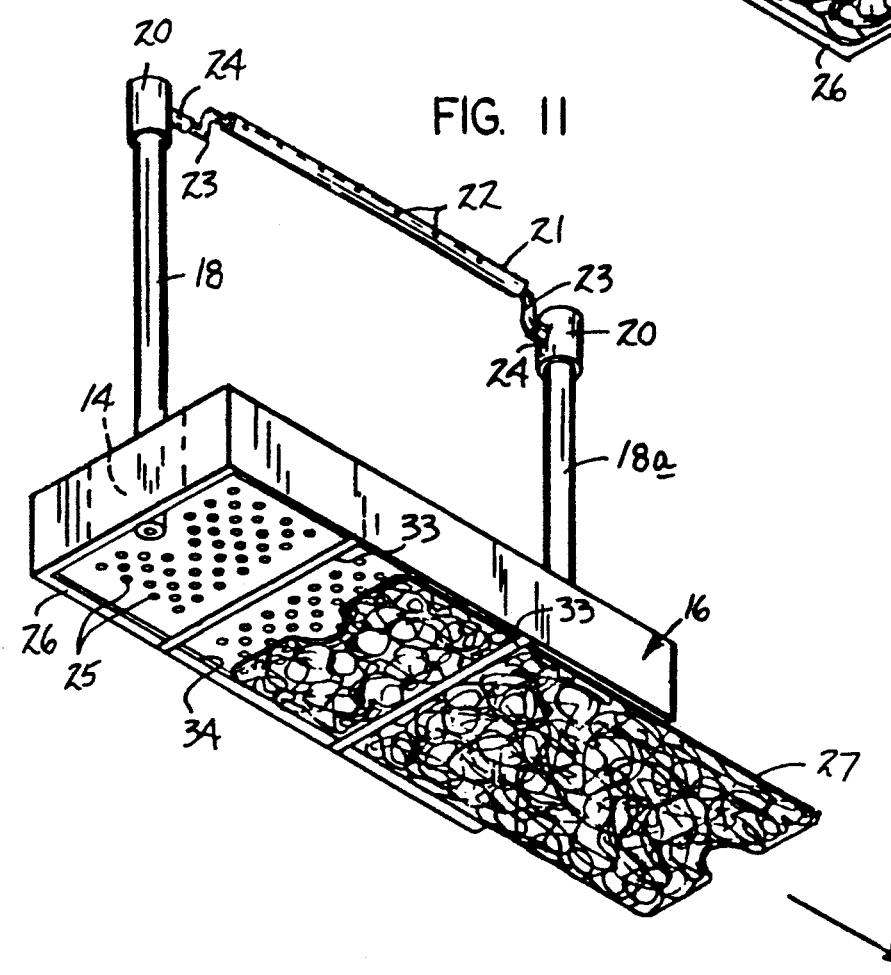

AQUARIUM AERATION AND RECYCLING APPARATUS

BACKGROUND OF THE INVENTION

1. Field of the Invention

The field of the invention relates to aquarium apparatus, and more particularly pertains to a new and improved aquarium aeration and recycling apparatus wherein the same enhances oxygenation of the water while minimizing turbulence thereof.

2. Description of the Prior Art

Aquarium apparatus of the prior art has typically recirculated water and directed the thusly recirculated water into the bottom portion of an aquarium or an area adjacent thereto. The effect of such recirculation in the filtration procedure has created turbulence areas to agitate fish and accordingly result in lessened breeding and enhanced unnecessary activity of the fish in the aquarium environment. The instant invention attempts to overcome deficiencies of the prior art in directing the thusly recirculated water to enhance aeration of the water.

Examples of the prior art include SAXTON U.S. Pat. No. 4,025,431 wherein a conventional filtration arrangement is provided directing water about a lower portion of the aquarium.

VROEGINDAY U.S. Pat. No. 4,035,299 provides filtration arrangement wherein an output filtered water is projected onto a top surface of the aquarium water level to thereby create a turbulent fluid flow as it impacts the surface of the aquarium water.

BLISS et al U.S. Pat. No. 4,144,841 wherein a fluid and air mixture is projected from a single tube for projection within a portion of the aquarium.

LOCKSHAW U.S. Pat. No. 4,169,793 provides for a tank drain assembly for use with swimming pool filters including a particular locking arrangement for securing tubes into sockets of a manifold of the drain organization defined by the apparatus.

SMITH U.S. Pat. No. 4,123,359 provides a water purifying arrangement for aquariums wherein the output of the filtration organization is projected over an overflow lip above the water level of the aquarium.

As such, it may be appreciated that there continues to be a need for a new and improved aquarium aeration and recycling apparatus wherein the same addresses both the problems of ease of use as well as effectiveness in construction and in this respect, the present invention substantially fulfills this need.

SUMMARY OF THE INVENTION

In view of the foregoing disadvantages inherent in the known types of aquarium fluid recycling apparatus present in the prior art, the present invention provides a new and improved aquarium aeration and recycling apparatus wherein the same utilizes an elongate circulation tube directed coextensively of an aquarium including fluid apertures therethrough to enhance aeration and circulation of the fluid throughout the aquarium. As such, the general purpose of the present invention, which will be described subsequently in greater detail, is to provide a new and improved aquarium aeration and recycling apparatus which has all the advantages of the prior art aquarium recycling apparatus and none of the disadvantages.

To attain this, the aquarium aeration and recycling apparatus of the invention includes apparatus including an aquarium tank formed of a floor and spaced side walls with the organization arranged interiorly of the aquarium adjacent to an upper water level of water within the aquarium. The apparatus includes a single or plurality of pump members to direct water through a housing including filtration portions thereon to direct the recycled and thusly cleaned water through output conduits arranged adjacent the side walls of the aquarium and to direct the thusly cleaned water through a circulation tube to direct the water at the water level surface to enhance aeration and minimize turbulence within the aquarium. The circulation tube in a modified embodiment is formed of a transparent material including an array of parallel fiber optic cables to effect illumination and coloration of the recirculated water for an enhanced visual effect.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium aeration and recycling apparatus which has all the advantages of the prior art aquarium fluid recycling apparatus and none of the disadvantages.

It is another object of the present invention to provide a new and improved aquarium aeration and recycling apparatus which may be easily and efficiently manufactured and marketed.

It is a further object of the present invention to provide a new and improved aquarium aeration and recycling apparatus which is of a durable and reliable construction.

An even further object of the present invention is to provide a new and improved aquarium aeration and recycling apparatus which is susceptible of a low cost of manufacture with regard to both materials and labor, and which accordingly is then susceptible of low prices of sale to the consuming public, thereby making such aquarium aeration and recycling apparatus economically available to the buying public.

Still yet another object of the present invention is to provide a new and improved aquarium aeration and recycling apparatus which provides in the apparatuses and methods of the prior art some of the advantages thereof, while simultaneously overcoming some of the disadvantages normally associated therewith.

Still another object of the present invention is to provide a new and improved aquarium aeration and recycling apparatus which may be compactly stored when not being utilized.

Yet another object of the present invention is to provide a new and improved aquarium aeration and recycling apparatus wherein the same is arranged to enhance oxygenation of the water and minimize turbulence of fluid within the aquarium.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken in elevation of the instant invention.

FIG. 4 is an isometric illustration of the circulation tube utilized by the instant invention.

FIG. 8 is an isometric illustration of a modification of the circulation tube of the instant invention.

FIG. 9 is an orthographic view taken along the lines 9—9 of FIG. 8 in the direction indicated by the arrows.

FIG. 10 is an isometric illustration of the filtration housing utilized by the instant invention.

FIG. 11 is a isometric illustration of the filtration housing and an operative filtration plate replaceable relative thereto.

DESCRIPTION OF THE PREFERRED EMBODIMENT

Figure 1:
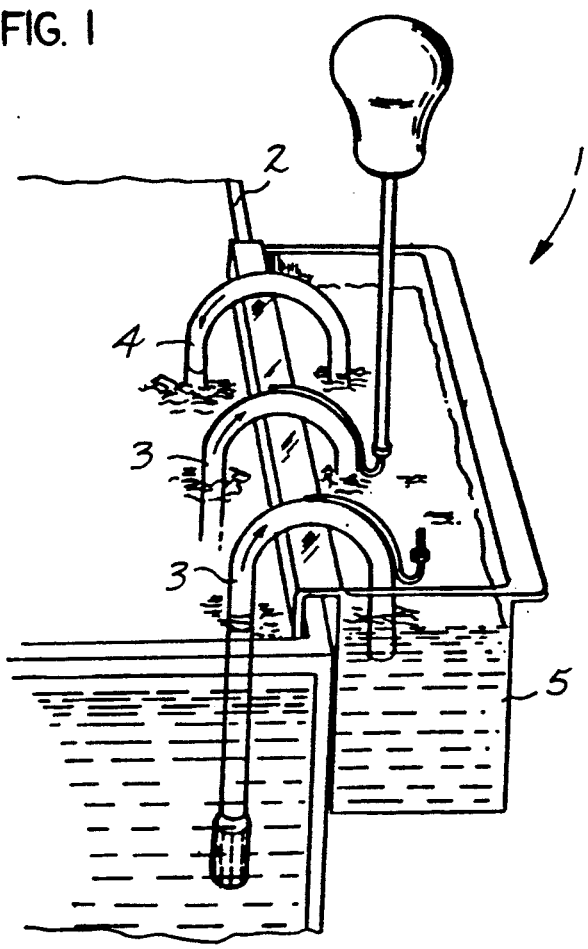
FIG. 1 is an isometric illustration of a prior art aquarium filtration organization.

With reference now to the drawings, and in particular to FIGS. 1 to thereof, a new and improved aquarium aeration and recycling apparatus embodying the principles and concepts of the present invention and generally designated by the reference numeral 10 will be described.

Figure 2:
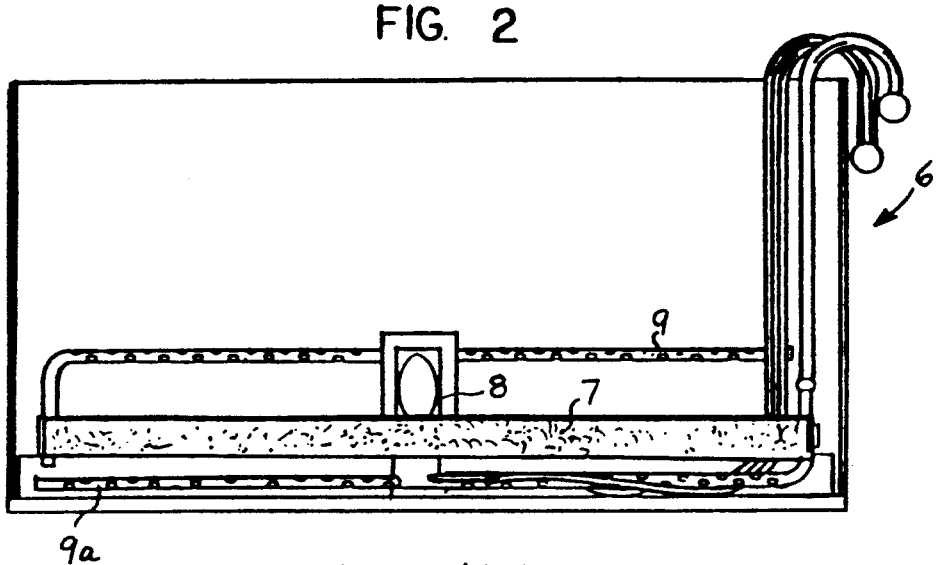
FIG. 2 is an orthographic side view taken in elevation of a prior art aquarium filtration organization.
Figure 5:
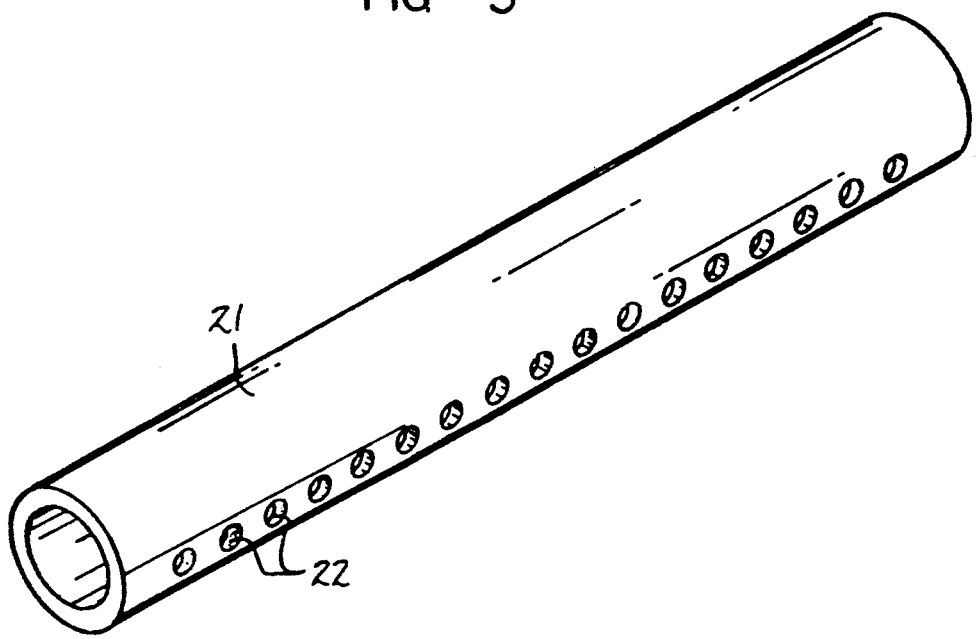
FIG. 5 is an isometric illustration of the circulation tube utilized by the instant invention of a narrowed spacing between output apertures.

FIG. 1 illustrates a prior art apparatus 1 including an aquarium tank 2 with a predetermined quantity of water therewithin the plurality of intake conduits 3 and an output conduit 4 positioned above a water level of the water within the aquarium to direct clean water through the filtration organization 5. FIG. 2 illustrates a prior art organization 6 including a pump member 8 and a filter member 7 to clean water directed from the associated output and input conduits 9 and 9a arranged adjacent the bottom of the aquarium.

More specifically, the aquarium aeration and recycling apparatus 10 of the invention essentially comprises an aquarium tank 11 defined by a planar floor 12 and spaced parallel side walls 13 including a quantity of water therewithin either fresh or salt water for the environmental housing of fish therewithin.

A first pump member 14 and a second pump member 14a are mounted within the aquarium tank 11 adjacent the floor and opposing plurality of spaced side walls. An input chamber 15 within a housing 16 receives the water through a matrix of upper housing apertures 16a that directs the water through a filter member 17 that is coextensively mounted overlying the housing and floor 16 and 12 respectively of the organization. A first output conduit 18 and a second output conduit 18a are in fluid and operative association with the respective first and second pump members 14 and 14a to direct fluid respectively therethrough wherein the output conduits are positioned adjacent the opposed side walls 13 of the aquarium. A first and second connector housing 20 and 20a is mounted to respective upper terminal end of each respective first and second output conduit 18 and 18a to direct the cleansed water to a circulation tube 21 that is mounted within the aquarium tank 11 parallel to the floor 12 and adjacent a water level 19. The circulation tube 21 includes a linear array of circulation tube apertures 22 to direct the circulated water along and adjacent to the surface or water level 19 to enhance oxygenation or aeration within the aquarium.

Figure 6:
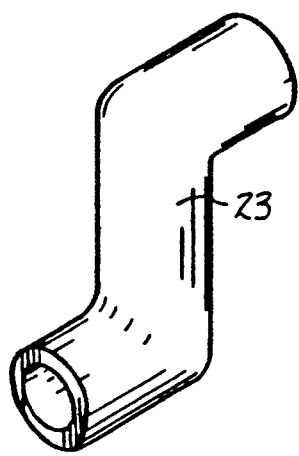
FIG. 6 is an isometric illustration of an S-shaped connector utilized by the instant invention.
Figure 7:
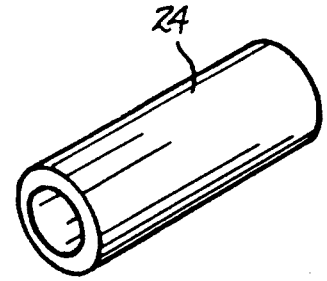
FIG. 7 is an isometric illustration of a cylindrical connector member utilized by the instant invention.

To permit adjustment of the circulation tube 21 adjacent the water level 19, each connector housing 20 and 20a includes an S-shaped connector tube 23 (see FIG. 6 for example) that may be utilized in cooperation with a connector conduit 24 to provide fluid communication between the circulation tube 21 and each respective connector housing 20 and 20a. In this manner, the circulation tube 21 may be rotated by rotation of the S-shaped tubes 23 to position the circulation tube 21 adjacent the water level 19. The circulation tube apertures 22 may be spaced apart in a range from 0.01 inches to 3.0 inches with the apertures defined by diameter from 0.01 inches to 0.5 inches dependent upon required fluid flow. The tube may vary according to requirements and length of an associated aquarium and is simply in a range from 6 inches to 120 inches.

FIGS. 10 and 11 illustrate the housing 16 and associated assembly wherein the housing 16 includes a matrix of lower housing apertures 25 spaced in a recessed relationship relative to a U-shaped housing flange 26 that includes a U-shaped groove 34 to slidably receive a replaceable filter plate 27 in a manner as illustrated in FIGS. 10 and 11. A plurality of retainer bars 33 are orthogonally and integrally mounted across the sides of the housing 16 presenting opposed legs of the U-shaped flange 26.

A transparent circulation tube 28 is illustrated for use as a replacement circulation tube to include a plurality of fiber optic cables 29 directed coextensively about a exterior surface of the tube 28 that are mounted adjacent and in a contiguous relationship relative to one another of a preselected coloration that are directed at their rear terminal ends within an illumination housing 30 in confronting relationship to illumination bulb 31 to effect illumination of the cables 29 and the associated transparent circulation tube 28. A power supply 32 is in operative association with the bulb 31 for its selective actuation. In this manner, an array of water directed from the circulation tube 28 may be provided with a desired coloration for enhanced visual effect in use of the organization and thereby mask the apparatus and particularly the circulation tube 28 from its apparent positioning relative to the top surface of the water level within the aquarium.

Further, it should be understood that should a single pump member 14 be utilized, a single output conduit 18 is to be utilized whereupon a free end of the circulation tube would be plugged to effect fluid flow through the apertures 22.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium aeration and recycling apparatus comprising in combination,
    an aquarium tank, the aquarium tank including a planar floor, and
    plural pairs of spaced planar side walls wherein one of the pairs of the side walls includes a first and second opposed side wall, and
    a housing overlying the planar floor, and
    the housing including at least one output conduit, and
    the housing further including at least one pump member within the housing in operative association with the output conduit, and
    a filter member coextensively mounted overlying an upper surface of the housing, and
    the upper surface of the housing including a matrix of upper housing apertures directed therethrough to permit fluid flow through the filter member into the housing, and
    the aquarium tank including a predetermined quantity of water, the water including a water surface level, and
    at least one output conduit mounted to the housing adjacent the first side wall, and
    at least one output conduit extending upwardly to the water surface level, and
    a circulation tube in fluid communication with at least one output conduit arranged parallel to the planar floor, the circulation conduit including a linear array of circulation tube apertures to direct fluid flow therethrough, and
    wherein the circulation tube apertures are positioned adjacent the water surface level and arranged to direct fluid flow parallel to the water surface level.

2. Apparatus as set forth in claim 1 including an S-shaped tube mounted to the circulation tube coaxially therewith and to the output conduit to permit selective rotation of the circulation tube and permit adjustment of the circulation tube adjacent the water surface level.

3. Apparatus as set forth in claim 2 wherein the housing includes a matrix of lower housing apertures directed through a bottom surface of the housing, and the bottom surface of the housing including a U-shaped housing flange extending beyond the lower housing apertures, and the housing flange including a groove, the groove slidably receiving a removable filter plate.

4. Apparatus as set forth in claim 2 wherein the housing flange includes a plurality of retainer bars extending orthogonally between opposed sides of the housing flange and the housing to overlie the lower housing apertures and secure the filter plate relative to the housing apertures within the housing flange.

5. Apparatus as set forth in claim 4 wherein the circulation tube is transparent.

6. Apparatus as set forth in claim 5 wherein the circulation tube includes a plurality of fiber optic cables coextensive with and contiguously mounted adjacent an exterior surface of the circulation tube and the fiber optic cable of a preselected coloration.

7. Apparatus as set forth in claim 6 wherein the fiber optic cables extend beyond the circulation tube within illumination housing, the illumination housing including an illumination bulb positioned adjacent the fiber optic cable to effect selective illumination of the fiber optic cables.

* * * * *